United States Patent [19]

Arvanitakis

[11] 4,014,790

[45] * Mar. 29, 1977

[54] APPARATUS FOR RECYCLING FILTRATION MEDIA

[76] Inventor: Kostas Savas Arvanitakis, 14945 S. Dogwood Ave., Orland Park, Ill. 60462

[ * ] Notice: The portion of the term of this patent subsequent to Dec. 12, 1989, has been disclaimed.

[22] Filed: Sept. 30, 1975

[21] Appl. No.: 618,138

[52] U.S. Cl. .............................. 210/107; 100/93 S; 210/179; 210/188; 210/195 R; 210/259; 210/415

[51] Int. Cl.² ........................................ B01D 23/24

[58] Field of Search ............ 210/66, 73, 179, 259, 210/330, 331, 332, 333, 334, 322, 188, 195, 415; 100/93 S

[56] References Cited

UNITED STATES PATENTS

| | | | |
|---|---|---|---|
| 2,893,925 | 7/1959 | Victor | 210/68 |
| 3,270,885 | 9/1966 | Anderson | 210/334 |
| 3,478,885 | 11/1969 | Jackson | 210/330 X |
| 3,705,648 | 12/1972 | Arvanitakis | 210/66 |
| 3,705,649 | 12/1972 | Arvanitakis | 210/66 |

*Primary Examiner*—Theodore A. Granger
*Attorney, Agent, or Firm*—August E. Roehrig, Jr.

[57] ABSTRACT

A filtration system discharging dry sludge material comprising filter aid material and contaminants removed from the liquid which have all been subjected to heat and mechanical action. These materials are conveyed from the discharge of the filtration system to a feeder for controlled introduction into the filtration system as necessary, or for disposal or reclamation.

10 Claims, 2 Drawing Figures

APPARATUS FOR RECYCLING FILTRATION MEDIA

BACKGROUND OF THE INVENTION

This invention relates in general to an improved method and apparatus for recycling spent filter air material for reuse.

Filter aids, such as diatomaceous earth used for precoat filtration by absorption and particle retention; pulverized activated carbon used for absorption of traces or organic matter, odor and taste; anionic and cationic resins used for ion exchange, can all be regenerated so that they can be used more than once. Heat can be used to dry the spent filter aids so completely that dissolved solids are removed from the filter aids' porous structure, so that these filter aids can be reused for further filtration. Higher temperatures can be employed for evaporation, extending regeneration for more effective and economical usage of these materials.

In K. S. Arvanitakis, U.S. Pat. No. 3,705,648, "FILTRATION SYSTEM", there is disclosed a system for filtering materials from a contaminated liquid wherein the materials removed from the liquid are expelled from the system completely dry. During the cycle of operation of the system disclosed in this patent the spent filter aid materials are removed into the contaminated liquid in combination with new filter aid material circulated through the secondary filter to form a new filter cake precoat on the secondary filters.

Even though diatomaceous earth precoat pressure-filtration is known to have capabilities of filtering and removing sub-micron particles size solids from liquid, this process is somewhat more expensive than other filtration systems which do not use such filter aids. Due to this higher operating cost, many attempts have been made to adopt methods other than filtration, such as settling, or centrifuging which are not as effective as diatomaceous earth filtration. Completely dry discharge of the solids material from a diatomaceous earth filtration system not only provides an efficient and economical manner in which the solids material may be disposed, but affords an opportunity to recycle or reclaim the solids material in order to use them for additional filtration cycles.

SUMMARY OF THE INVENTION

It is, therefore, an object of this invention to reduce the operating cost of diatomaceous earth pressure-filtration by reusing completely dried and partially regenerated filter aids for precoat.

Another object of this invention is to form a much tighter filter cake for finer particle size retention due to the reuse of diatomaceous earth filter aid after being completely dried through the degradation of spent filter aids mixed with crystralized solids created by mechanical action and heat.

Still another object of this invention is to reduce operating costs of diatomaceous earth pressure-filtration systems by utilizing the spent filter aids and other solids for body feeding maintaining the filter cake progressively porous achieving longer and more economical filteration cycles.

DESCRIPTION OF THE DRAWINGS

Further objects of the invention, together with additional features contributing thereto and advantages accruing therefrom, will be apparent from the following description of one embodiment of the invention when read in conjunction with the accompanying drawings, wherein.

DESCRIPTION OF A PREFERRED EMBODIMENT

Figure 1:
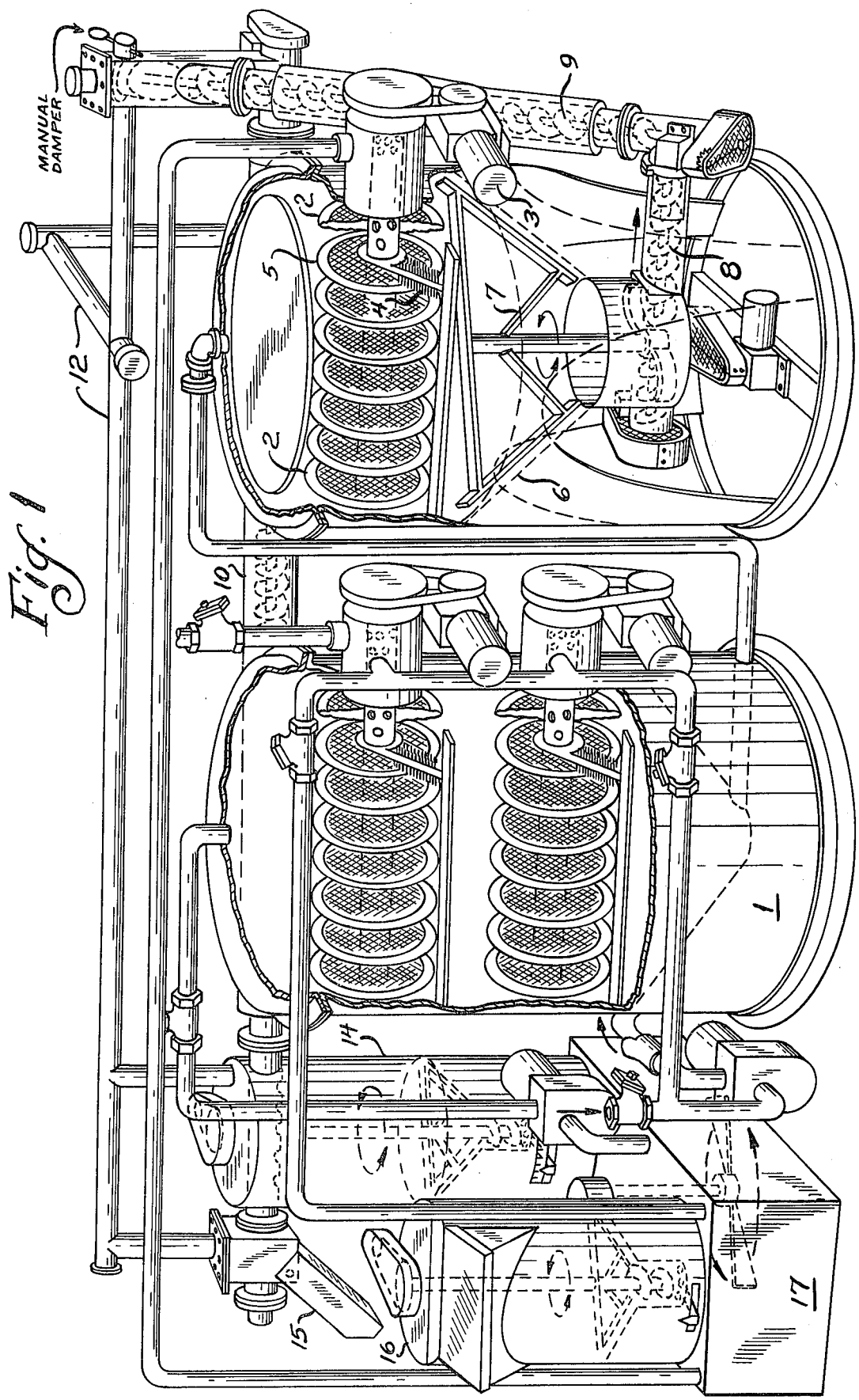
FIG. 1 is a frontal perspective view of a primary and secondary filtration system with portions removed to illustrate the manner in which expended filter aids and contaminants are removed from the contaminated liquid and conveyed from the filtration system, treated and reintroduced for further use.
Figure 2:
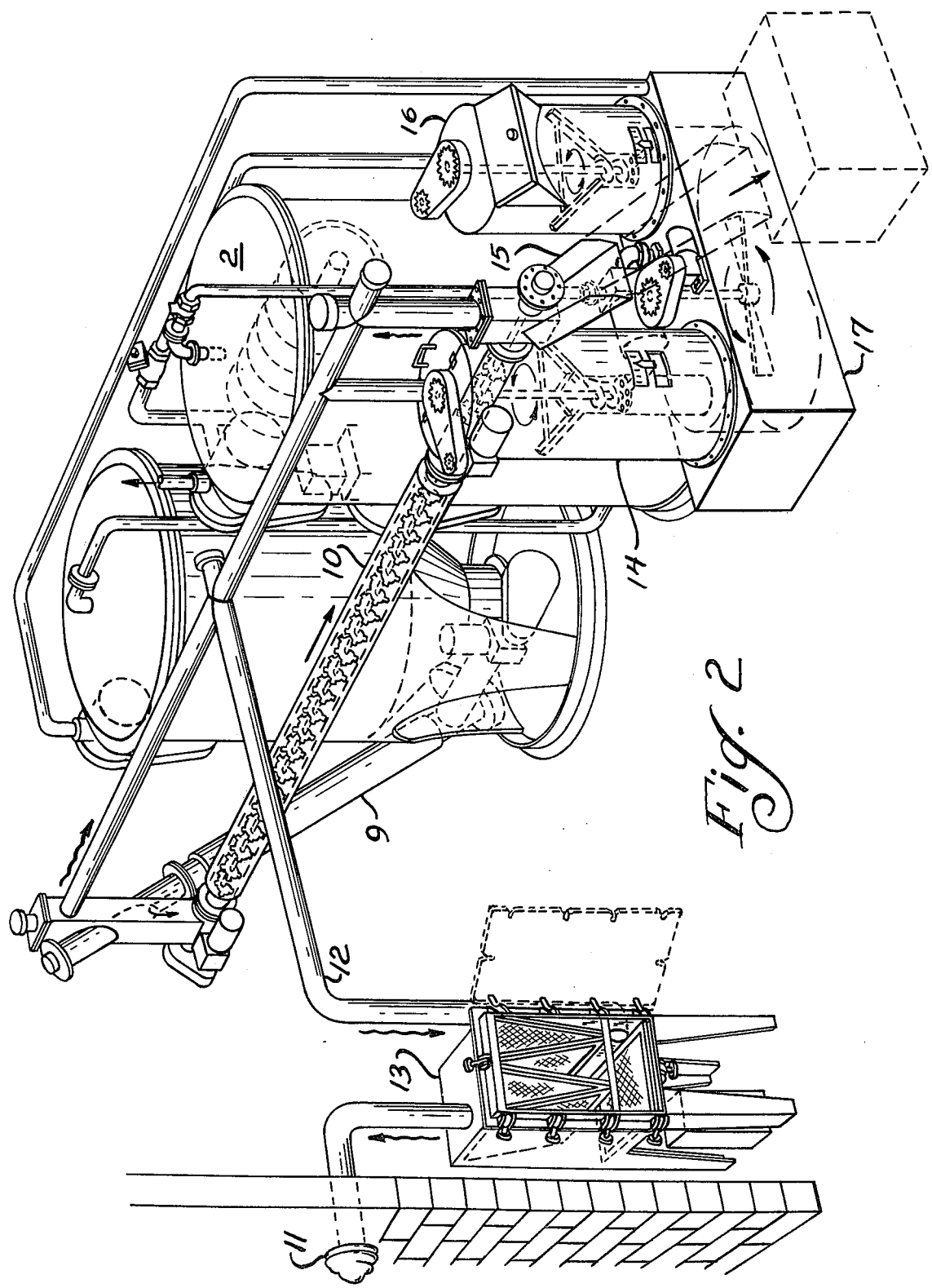
FIG. 2 is a rear perspective view of the system shown in FIG. 1 to better illustrate the manner in which the materials removed from the filtration system are recycled for further use or discharged.

Referring now to FIG. 1 there is shown a primary and secondary filtration system wherein the primary 1 and secondary 2 filters are used to remove suspended solids material from a liquid. The solids material removed from the liquid are accumulated on the filter discs 5 of the secondary filter whereat they are periodically removed and conveyed to a heated auger 9 which expels the materials from a discharge outlet in a dry or semi-dry state depending upon the amount of heat applied to the materials. A suitable filtration system such as shown in FIGS. 1 and 2 and a suitable secondary filter or desludger are described in K. S. Arvanitakis, U.S. Pat. Nos. 3,705,648 and 3,705,649. The disclosures of these two patents are specifically incorporated herein by reference in the disclosure of this application.

The sludge, comprising used filter aid and removed solids material, is passed from the heated discharge auger 9 into the refeed auger 10 for conveying the dried sludge to a feeder 14 where this material can be reintroduced into a mixing chamber 17 for reuse. An exhaust fan 11 is energized during this transfer so that the vapors transmitted during transfer will pass through a vapor exhaust filter 13 to remove any particulate matter.

The refeed auger 10 conveys the dried solids material to the feeder 14. A portion of the refeed auger passes through the upper part of the feeder tank 14 and has openings along the bottom portion of the auger tube to allow the dried sludge material to drop into the feeder tank until such time as it is filled to the level of the auger 10. When the feeder tank is filled, the excess dried sludge is carried out through the feeder tank to the discharge chute 15 for disposal or reclamation. The feeder 14 is positioned on top of the feeder mixing tank 17 to discharge its content into the tank and structurally is the same as that disclosed in the previously referred to Arvanitakis patents.

When the filtration system enters its precoat phase as described in U.S. Pat. No. 3,705,648, the feeders 14 and 16 (similar to 14) are energized to add solids material to the feeder mixing tank 17 for precoating the primary filter. During the precoating sequence wherein the liquid is circulated through the primary filter the feeders 14 and 16 are activated for a time period to drop a predetermined amount of material into the mixing tank. These filter precoatings, which heretofore have required new filter aid material can now utilize the sludge material which has been recycled through the primary and secondary filtration operations.

The length of time in which the feeders 14 and 16 will deposit filter aid material to the feeder mixing tank 17 will be determined by the density of the recycled filter aid from feeder 14 as well as the new filter aid material at feeder 16. The amount of recovered filter aid which is recycled for reuse is dependent upon the particular application and the characteristics of the solids material to be filtered. However, no matter what proportion of recovered filter aid may be recycled for reuse in the filtration operation, the cost savings are substantial resulting in a much more commercially usable product.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for clarifying a liquid having suspended solids material therein and reusing the filter cake material comprising
    means for passing contaminated liquid having suspended solids material therein through a first filter cake material bearing filtration means,
    means for interrupting the passing of the contaminated liquid upon the accumulation of a predetermined amount of solids material,
    means for removing the filter cake material and the accumulated solids into suspension in the contaminated liquid,
    means for withdrawing the contents of the primary filter chamber into a secondary filter chamber and through a second filtration means,
    second filtration means carried within a secondary filter chamber for removing the suspended filter cake material and solids material from said clarified liquid,
    means for interrupting the passing of liquid from said primary filter chamber into said secondary filter chamber,
    means actuable upon the interruption of liquid passing into said secondary filtration chamber to remove the collected suspended filter cake material and suspended solids into said secondary filter chamber,
    conveyor means for removing said suspended filter cake materials and suspended solids materials from said secondary filter chamber,
    means for removing liquid from said suspended filter cake material and suspended solids material, and discharging said dried materials, and
    means for conveying said dried materials for introduction into said primary filter chamber.

2. The apparatus of claim 1 wherein said means for conveying said dried materials for introduction into said primary filter chamber comprises
    an auger tube operatively connected to said means for removing liquid from said suspended filter cake material and said solids material, and discharging said dried materials, and
    operatively connected to said primary filter chamber.

3. The apparatus of claim 2 further including a feeder tank operatively connected to said primary filter chamber, and
    wherein a portion of said auger tube passes through said feeder tank, said auger tube having a opening in said portion passing through said feeder tank to allow the dried materials conveyed to said auger tube to discharge into said feeder tank.

4. The apparatus of claim 3 further including means for discharging said dried materials from said means for conveying the dried materials for introduction into said primary filter chamber upon the accumulation of dried materials in said feeder tank to a level equal to the opening in said auger tube.

5. The apparatus of claim 1 further including means for withdrawing vapors formed during the removal of liquid from said suspended filter cake material and suspended solids material.

6. The apparatus of claim 5 further including means for withdrawing vapors formed during the conveying of said dried mateials for introduction into said primary filter chamber.

7. The apparatus of claim 5 further including means for filtering said vapors prior to discharge.

8. The apparatus of claim 6 including means for filtering said vapors prior to discharge.

9. The apparatus of claim 1 wherein said means for removing liquid from said suspended filter cake material and suspended solids material and, discharging said dried material comprises a heated auger conveyor.

10. The apparatus of claim 1 wherein said means for conveying said dried materials for introduction into said primary filter chamber is operatively connected to said means for removing said liquid from said suspended filter cake material and suspended solids material, and discharging said dried materials, to gravitationally discharge said dried materials into said means for conveying said dried materials for introduction into said primary filter chamber.

* * * * *

UNITED STATES PATENT OFFICE
CERTIFICATE OF CORRECTION

Patent No. 4,014,790            Dated March 29, 1977

Inventor(s) Kostas S. Arvanitakis

It is certified that error appears in the above-identified patent and that said Letters Patent are hereby corrected as shown below:

Column 1:

Line 7, the word "aid" should be substituted for "air";

Line 29, the word "and" should be inserted between "liquid" and in";

Column 4:

Line 20, the word "to" should be "by"; and

Line 38, the word "further" should be inserted between "6" and "including".

Signed and Sealed this nineteenth Day of July 1977

[SEAL]

Attest:

RUTH C. MASON
Attesting Officer

C. MARSHALL DANN
Commissioner of Patents and Trademarks